US006341252B1

United States Patent
Foo et al.

(10) Patent No.: US 6,341,252 B1
(45) Date of Patent: Jan. 22, 2002

(54) METHOD AND APPARATUS FOR CONTROLLING AN ACTUATABLE OCCUPANT PROTECTION DEVICE

(75) Inventors: Chek-Peng Foo, Ann Arbor; Carl A. Munch, Troy, both of MI (US); Steven M. Cash, Cedar Falls, IA (US); Timothy DeZorzi, South Lyon, MI (US); Farid Khairallah, Farmington Hills, MI (US); Stephen R. W. Cooper, Fowlerville, MI (US); Huahn-Fern Yeh, Novi, MI (US); Paul Leo Sumner, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/468,807

(22) Filed: Dec. 21, 1999

(51) Int. Cl.[7] .............................................. B06R 21/32
(52) U.S. Cl. ........................... 701/45; 701/1; 280/735; 280/734; 180/268; 180/273
(58) Field of Search ................................ 701/45, 1, 36; 280/735, 734, 802; 180/268, 273

(56) References Cited

U.S. PATENT DOCUMENTS

| | | | |
|---|---|---|---|
| 3,863,208 A | 1/1975 | Balban | |
| 4,381,829 A | 5/1983 | Montaron | |
| 4,862,091 A | 8/1989 | Hilebrand | |
| 5,335,176 A | 8/1994 | Nakamura | |
| 5,357,141 A | 10/1994 | Nitschke et al. | |
| 5,413,378 A * | 5/1995 | Steffens Jr. et al. | 280/735 |
| 5,454,591 A * | 10/1995 | Mazur et al. | 280/735 |
| 5,490,069 A | 2/1996 | Gioutsos et al. | |
| 5,624,132 A * | 4/1997 | Blackburn et al. | 280/735 |
| 5,626,359 A * | 5/1997 | Steffens Jr. et al. | 280/735 |
| 5,653,462 A * | 8/1997 | Breed et al. | 280/735 |
| 5,670,853 A * | 9/1997 | Bauer | 318/286 |
| 5,733,041 A | 3/1998 | Sedlak et al. | |
| 5,829,782 A * | 11/1998 | Breed et al. | 280/735 |
| 5,954,360 A * | 9/1999 | Griggs III et al. | 280/735 |
| 5,997,033 A * | 12/1999 | Gray et al. | 280/735 |
| 6,012,006 A * | 1/2000 | Ohneda et al. | 701/45 |
| 6,020,812 A * | 2/2000 | Thompson et al. | 340/438 |
| 6,079,738 A * | 6/2000 | Lotito et al. | 280/735 |
| 6,081,757 A * | 6/2000 | Breed et al. | 701/45 |
| 6,168,198 B1 * | 1/2001 | Breed et al. | 280/735 |
| 6,179,326 B1 * | 1/2001 | Breed et al. | 280/735 |

* cited by examiner

Primary Examiner—William A. Cuchlinski, Jr.
Assistant Examiner—Olga Hernandez
(74) Attorney, Agent, or Firm—Tarolli, Sundheim, Covell, Tummino & Szabo L.L.P.

(57) ABSTRACT

An apparatus (10) for controlling actuation of at least one actuatable protection device (18, 20, 22, 24) includes a controller (26) having a first sensor input effective to receive a first sensor signal (64, 66, 70) having a value indicative of a first condition of an occupant of the vehicle seat (14, 16). The apparatus (10) also includes a second sensor input effective to receive a second sensor signal (82, 84, 86, 88, 94) having a value indicative of a second condition of the occupant of the vehicle seat (14, 16). The controller (26) is operative to determine a default value for the value of the first sensor signal (64, 66, 70) upon determining that the value of the first sensor signal is either outside an expected range of values or is absent. The controller (26) is operative to provide a control signal (136, 174, 176) to control actuation of at least one actuatable protection device (18, 20, 22, 24). The control signal (136, 174, 176) has a value that varies as a function of the value of the second sensor signal and at least one of the received first sensor signal and the determined default value of the first sensor signal.

23 Claims, 5 Drawing Sheets

| | | BELTED | | | | | UNBELTED | | |
|---|---|---|---|---|---|---|---|---|---|
| W5 >85kg | LO (+21ms) | LO/MID/HI (+0ms) | | | W5 >85kg | LO (+21ms) | LO/MID/HI (+0ms) | | |
| W4 65kg – 85kg | LO (+21ms) | LO/MID/HI (+0ms) | | | W4 65kg – 85kg | LO (+21ms) | LO/MID/HI (+0ms) | | |
| W3 30kg – 65kg | LO (+21ms) | LO/MID/HI (+5 or +0ms) | | | W3 30kg – 65kg | LO (+21ms) | LO/MID/HI (+0ms) | | |
| W2 14kg – 30kg | LO (+21ms) | LO/MID/HI (+15ms) | | | W2 14kg – 30kg | LO (+21ms) | LO/MID/HI (+15ms) | | |
| W1 <14kg | NF | NF | | | W1 <14kg | NF | NF | | |
| | D1 ≤20 cm | D2 >20 cm | | | | D1 ≤20 cm | D2 >20 cm | | |

100' (BELTED table), 102' (UNBELTED table)

Fig.4

METHOD AND APPARATUS FOR CONTROLLING AN ACTUATABLE OCCUPANT PROTECTION DEVICE

TECHNICAL FIELD

The present invention relates to an apparatus and method for controlling an actuatable occupant restraint device for a vehicle. More particularly, the present invention relates to a method and apparatus for controlling an actuatable occupant restraint device having a plurality of sensor inputs.

BACKGROUND OF THE INVENTION

Actuatable occupant restraint systems, such as air bags and seat belt pretensioners, for vehicles are well known in the art. Such restraint systems include one or more collision sensing devices for sensing vehicle crash acceleration (vehicle deceleration). Air bag restraint systems further include an electrically actuatable igniter, referred to as a squib. When the collision sensing device senses a deployment crash event, an electrical current of sufficient magnitude and duration is passed through the squib to ignite the squib. When ignited, the squib initiates the flow of inflation fluid into an air bag from a source of inflation fluid, as is known in the art.

Certain known collision sensing devices used in actuatable occupant restraint systems are mechanical in nature. Still other known actuatable occupant restraint systems for vehicles include an electrical transducer, such as an accelerometer, for sensing vehicle crash acceleration. Systems using an accelerometer as a crash or collision sensor further include some circuitry, e.g., a controller, for monitoring the output of the accelerometer. The accelerometer provides an electrical signal having an electrical characteristic indicative of the vehicle's crash acceleration. The accelerometer is operatively connected to a controller, such as a microcomputer, which discriminates between a deployment and a non-deployment crash event by applying a crash algorithm to the acceleration signal. When a deployment crash event is determined to be occurring, the restraint is actuated, e.g., an air bag is deployed and/or a seat belt pretensioner is actuated.

One particular type of occupant restraint system known in the art is a multi-stage occupant restraint system that includes more than one actuatable stage associated with a single air bag. In a multi-stage air bag restraint system, air bag inflation is the result of the control of a multi-stage inflator. Such multi-stage air bag systems typically have two or more separate sources of inflation fluid controlled by actuation of associated squibs. Known control arrangements control the actuation of the multiple stages based on a timer function.

U.S. Pat. No. 3,966,224 is directed to a multi-stage air bag restraint system having two squibs. Under certain types of crash conditions, a first stage is actuated followed by actuation of a second stage a predetermined time after actuation of the first stage. If the crash acceleration is greater than a predetermined level, both stages are simultaneously actuated.

U.S. Pat. No. 4,021,057 is directed to a multi-stage air bag restraint system having a plurality of squibs for gas generators. Crash velocity is compared against a plurality of threshold values for control of the plurality of squibs and, in turn, control of the inflation rate of the air bag.

U.S. Pat. No. 5,400,487 is directed to an air bag restraint system having a plurality of separately controlled gas generators actuated at selected times in a selected order to control the air bag's inflation profile. The selective triggering is a function of both the detected crash type extrapolated from past received acceleration data and the occupant position based on received occupant position data.

U.S. Pat. No. 5,411,289 is directed to an air bag restraint system having a multiple level gas generating source. The electronic control unit is responsive to a combination of sensed inputs from the temperature sensor, the seat belt sensor, and the acceleration sensor for determining both an optimum gas generation level and inflation sequence times for controlling the multiple level gas generation source.

U.S. Pat. No. 5,626,359 is directed to an air bag restraint system which controls the amount of inflation fluid that flows into the air bag. A controller provides a control signal based on at least two sensed parameters to vent a portion of the available inflation fluid away from the air bag to achieve a desired level of inflation.

Many types of crash algorithms for discriminating between deployment and non-deployment crash events are known in the art. Algorithms typically are adapted to detect particular types of crash events for particular vehicle platforms. One example of such an algorithm is taught in U.S. Pat. No. 5,587,906 to McIver et al. and assigned to TRW Inc.

Air bag restraint systems are also known to require more than one sensor for detection of a deployment crash event. Often, the plural sensors are arranged in a voting scheme in which all the sensors must "agree" that a deployment crash event is occurring before restraint actuation is initiated. In certain known arrangements having a first and second sensor, the second sensor is referred to as a "safing sensor." Air bag actuation occurs only if the first sensor and the safing sensor indicate a deployment crash event is occurring.

SUMMARY OF THE INVENTION

The present invention is directed to an apparatus for controlling actuation of at least one actuatable protection device. The apparatus includes a first sensor input effective to receive a first sensor signal having a value indicative of a first condition of an occupant of the vehicle seat. The apparatus also includes a second sensor input effective to receive a second sensor signal having a value indicative of a second condition of the occupant of the vehicle seat. The apparatus is operative to determine a default value for the value of the first sensor signal upon determining that the value of the first sensor signal is not within an expected range of values. The apparatus is operative to provide a control signal to control actuation of the at least one actuatable protection device. The control signal has a value that varies as a function of the value of the received second sensor signal and at least one of the value of the received first sensor signal and the determined default value of the first sensor signal.

BRIEF DESCRIPTION OF THE DRAWINGS

The foregoing and other features and advantages of the invention will become more apparent to one skilled in the art upon consideration of the following description of the invention and the accompanying drawings in which:

FIG. 4 is numerical example of the control matrix shown in FIG. 3; and

DESCRIPTION OF PREFERRED EMBODIMENTS

Figure 1:
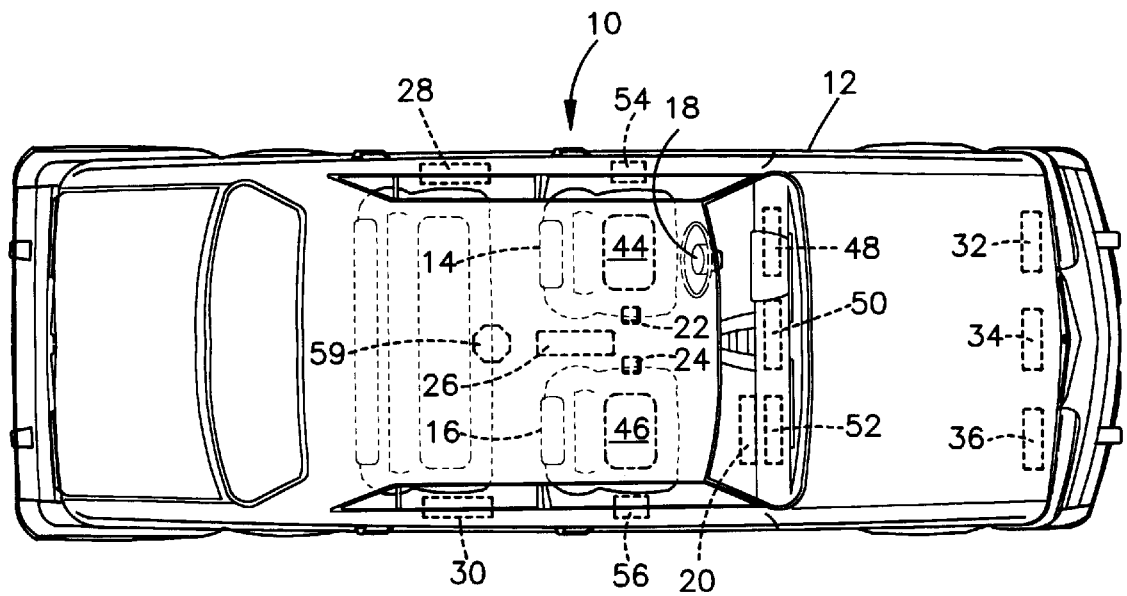
FIG. 1 is a schematic diagram of a vehicle equipped with a system in accordance with the present invention.

In accordance with the present invention, FIG. 1 illustrates an actuatable occupant restraint system 10 for use in a vehicle 12. The vehicle includes driver side and passenger side seats 14 and 16, respectively. The system 10 includes at least one and preferably a plurality of an actuatable restraint devices, such as air bags 18 and 20, associated with the vehicle seats 14 and 16, respectively. Preferably, each of the air bags 18 and 20 has multiple actuatable stages that can be simultaneously or sequentially actuated to provide controlled inflation. Actuatable seat belt pretensioner devices 22 and 24 are associated with the respective vehicle seats 14 and 16.

The system 10 may include other actuatable restraining protection devices. The present invention is applicable to restraining/protection systems that require more than one sensor input to control actuation of its associated restraining/protection devices. All outputs from such sensor devices are connected to a central control unit or controller 26. The controller 26 controls actuation of the actuatable restraint devices, such as the air bags 18 and 20 and pretensioner devices 22 and 24, in response to signals from the sensors and a control process in accordance with the present invention.

The controller 26 preferably is a microcomputer programmed to control actuation of the occupant protection devices system 18–24 in response to input signals from a plurality of sensors. The functionality of the microcomputer, alternatively, could be performed by one or more digital and/or analog circuits. The controller also may be embodied in an application specific integrated circuit (ASIC). The controller 26 includes a number of inputs equal to at least the greatest number of sensors expected in any given restraint system for which the controller is to be used. One vehicle platform may have six sensors. Another vehicle platform may have ten sensors. If ten is the maximum number of sensors, then the controller would need to have ten sensor inputs.

The restraint system 10 further includes a crash sensing system comprising at least one and preferably a plurality of crash sensors 28 and 30. Each crash sensor 28 and 30 preferably provides a crash acceleration signal having an electrical characteristic indicative of sensed crash acceleration. The crash acceleration signals are provided to the controller 26 which, in response to the crash acceleration signals, determines whether a deployment or non-deployment crash condition exists. While two such crash sensors 28 and 30 are illustrated as being remote from a central location of the vehicle 12, one or more centrally located crash acceleration sensors alternatively or additionally may be used.

In addition to the crash acceleration sensors 28 and 30, the crash sensing system preferably also includes crush zone sensors 32, 34, and 36 mounted in a forward portion of the vehicle 12. The crush zone sensors 32, 34, and 36, for example, may be mounted at the radiator location of the vehicle 12 so as to better discriminate certain types of vehicle crash conditions. The crush zone sensors 32, 34, and 36 each provides a signal to the controller 26 having an electrical characteristic functionally related to the crash acceleration experienced by the portion of the vehicle 12 to which that sensor is mounted.

The system 10 also includes a weight sensing system 44, 46 having at least one and preferably a plurality of weight sensors associated with each respective vehicle seat 14, 16. Each weight sensing system 44, 46 preferably is formed of a plurality of individual sensors which provide electrical signals having electrical characteristics indicative of the weight of an object located on each respective seat 14, 16. The signals also may provide an indication of the occupant's position and/or center of gravity relative to the seat 14, 16. The weight sensors of each weight sensing system 44 and 46 provide signals to the controller 26 which are used to determine the weight and position of an object located on each respective seat 14 and 16.

The restraint system 10 also includes an occupant sensing system which includes at least one and preferably a plurality of occupant sensing devices 48, 50, 52, 54, and 56. In FIG. 1, the sensor 48 is an occupant position sensor, such as an ultrasonic or capacitive sensor, for sensing the position of the driver on the seat 14 relative to the location of air bag 18. The occupant sensor 50 is preferably an ultrasonic or capacitive occupant position sensor located centrally on the vehicle dash intermediate seats 14 and 16. The sensor 50 detects whether an occupant is out of position relative to associated restraint devices 18 and 20. Similarly, the sensor 52 is preferably an ultrasonic or capacitive occupant position sensor for sensing the position of a passenger or other object which may be located on seat 16 relative to the location of air bag 20.

Sensors 54 and 56 are seat position sensors associated with vehicle seats 14 and 16, respectively. The seat position sensors 54 and 56 are operatively connected between each respective seat and the adjacent vehicle floor. The sensors 54 and 56 provide electrical signals indicative of the position of the respective seats 14 and 16 relative to the vehicle floor and, in turn, relative to a fixed point of reference within the vehicle compartment. The sensors 54, 56, indicate the position of the seats 14 and 16 relative to the air bags 18, 20, respectively.

Each of the occupant sensors 48, 50, 52, 54 and 56 provides a signal to a corresponding input of the controller 26. Each sensor signal has an electrical characteristic indicative of an aspect of an occupant position. Preferably, each of the sensors 48, 50, 52, 54 and 56 detect different aspects of position so as collectively to provide a more comprehensive measurement of an occupant's position relative to associated air bags 18, 20. The operation of similar occupant position sensors is disclosed in greater detail in U.S. Pat. No. 5,626,359 to Steffens, Jr. et al.

While the occupant sensing devices 48, 50 and 52 have been described as either ultrasonic or capacitive type of sensors, it is contemplated that other types of sensors could be used to monitor occupant position. Such other sensors include, for example, a seat back angle sensor, a seat belt payout sensor, an infrared sensor, a radar position sensor, a microwave position sensor and/or any other known occupant sensors. These and/or other position sensing devices also could be mounted at other locations within the vehicle 12 to monitor other aspects of the position of objects located on the vehicle seats 14 and 16.

The system 10 of FIG. 1 preferably also includes a rollover sensor 59 for detecting a rollover condition of the vehicle 12. Preferably, the rollover sensor 59 is a centrally located sensing device that provides a signal to the controller 26 having an electrical characteristic indicative of the occurrence of a vehicle rollover condition.

Figure 2:
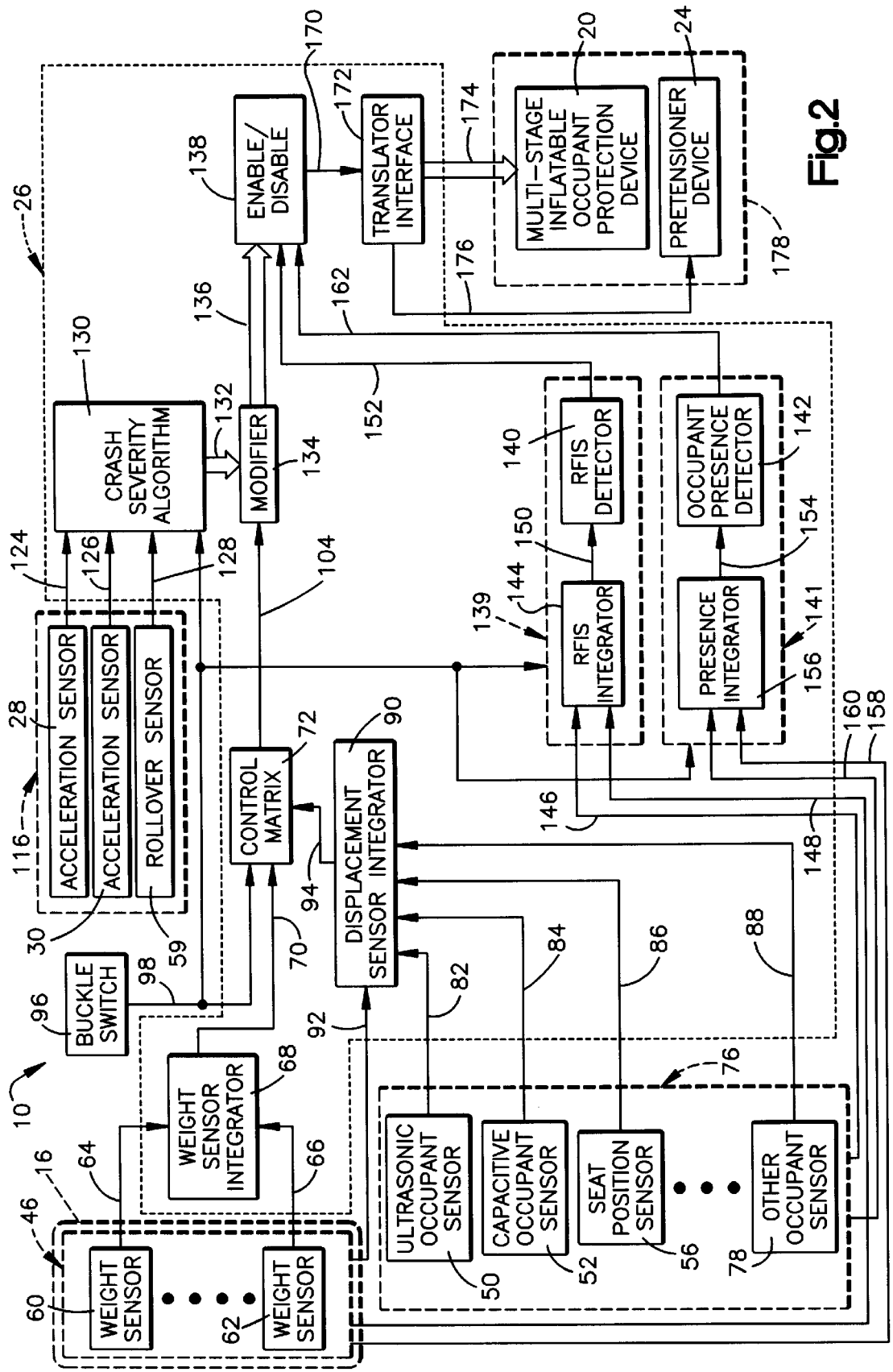
FIG. 2 is a function diagram representing the system of FIG. 1 configured for a passenger seat in accordance with the present invention.

FIG. 2 illustrates an actuatable occupant protection system 10, in accordance with a preferred embodiment of the present invention, for the passenger side of the vehicle 12. The passenger-side air bag 20 is described as a multi-stage inflatable protection device, although the present invention is equally applicable to a restraint system having a single stage air bag.

The restraint system 10 further includes a weight sensor system 46 for the occupant seat 16 that includes at least one and preferably a plurality of weight sensors, two of which are indicated at 60 and 62. The weight sensors 60 and 62 are operatively mounted within the seat 16 to provide weight sensor signals 64 and 66, respectively, to a weight sensor integrator 68 of the controller 26. The weight sensor signals 64 and 66 have electrical characteristics indicative of a measured weight of an object located on the seat 16.

The weight sensors 60 and 62, for example, may be located within the seat cushion of the seat 16 or operatively connected between the seat and the vehicle floor. By positioning the plurality of weight sensors, such as 60 and 62, at predetermined locations relative to the seat 16, the signals 64–66 also can be used to derive an indication of the position of an object's center of gravity relative to the vehicle seat 16. The signals 64 and 66 of the weight sensor system 46 also provide an indication as to whether an object is located on the seat 16. If no weight is sensed, it is assumed there is no object on the seat 16.

The weight sensor integrator 68 preferably is a software module stored in memory of the controller 26. The weight sensor integrator 68 resolves and/or integrates the output signals 64 and 66 from the various weight sensors 60 and 62 of the weight sensing system 46 to provide a signal 70 having a value indicative of integrated occupant weight information of an object located on the seat 16.

The integrator 68 is configured for a particular vehicle platform to provide a normalized indication of weight based on the weight sensor signals 64 and 66. The weight sensor integrator 68 provides the signal 70 to a control matrix 72. The weight information of signal 70 permits multiple levels of control. That is, the weight information of signal 70 may be provided to the control matrix 72 as discrete data for each aspect of weight and/or center of gravity being monitored. The control matrix 72 is described in greater detail below.

The restraint system 10 of FIG. 2 also includes an occupant position sensing system 76 for sensing various conditions or characteristics of a vehicle occupant or other object located on the seat 16. The occupant position sensing system 76 for the passenger seat 16 includes at least the position sensing devices 50, 52, and 56 described with respect to FIG. 1. Other occupant sensing equipment 78, such as an infrared, radar, or microwave sensor, also may be used to help provide a more complete indication of the position of the occupant or other object located on the seat 16.

The position sensors 50, 52, 56, and 78 provide respective signals 82, 84, 86, and 88 to a displacement sensor integrator 90. The signals 82, 84, 86, and 88 each has an electrical characteristic indicative of the position of an occupant or other object located on the seat 16. The weight sensing system 46 also provides a signal 92 or signals to the displacement sensor integrator 90 having a value indicative of a weight and/or position characteristic of the object located on the seat 16.

The displacement sensor integrator 90 preferably is in the form of a software module stored in memory within the controller 26. The displacement sensor integrator 90 is configured according to the particular vehicle platform in which the system 10 is installed. The displacement sensor integrator 90 integrates and/or resolves the output signals 82, 84, 86, 88 from the occupant sensing system 76 as well as the signal 92 from the weight sensing system 46 to derive an indication of occupant position.

Preferably, each of the sensors 50, 52, 56, and 78 provides a measurement of a different characteristic of the position of an object located on the seat 16. This enables the integrator 90 to combine the signals 82–88 and 92 so as to derive an overall and substantially comprehensive indication of the object's position on the seat 16 relative to the position of the air bag 20. Since the location of the air bag 20 is fixed relative to the vehicle's interior, and the seat and occupant are both movable, proper control of the air bag 20 requires knowledge of the occupant's position relative to the air bag location.

The integrator 90 provides a signal 94 to the control matrix 72 having a characteristic indicative of the detected occupant position. In particular, the signal 94 provides information to the control matrix 72 indicating the position of the occupant or an article on the seat relative to position of the air bag 20 within the vehicle 12 (FIG. 1). The position information of signal 94 may have a value within one of a plurality of discrete ranges for air bag control according to the position characteristics being monitored. Control of air bag deployment in response to discrete range grouped into control zones is disclosed in U.S. Pat. Nos. 5,413,378 and 5,626,359.

The system 10 also includes a buckle switch detector 96 operatively connected with the buckle of the seat belt assembly of the passenger seat 16. The buckle switch detector 96 detects whether a seat belt tongue and corresponding buckle are in a latched condition, i.e., whether the seat belt of the seat 16 is belted (buckled) or unbelted (unbuckled). The buckle switch detector 96 is electrically connected to the controller 26. The buckle switch detector 96 provides a buckle switch signal 98 to the control matrix 72 indicating the detected status of the seat belt buckle switch.

The control matrix 72 is responsive to the weight sensor integrator signal 70, the displacement sensor integrator signal 94, and the buckle switch signal 98. The control matrix 72 is embodied as a plurality of control characteristics stored in memory of the controller 26. Selection of the control characteristics is a function of the outputs of the weight sensor integrator 68, the displacement sensor integrator 90, and the buckle switch 96.

Figure 3:
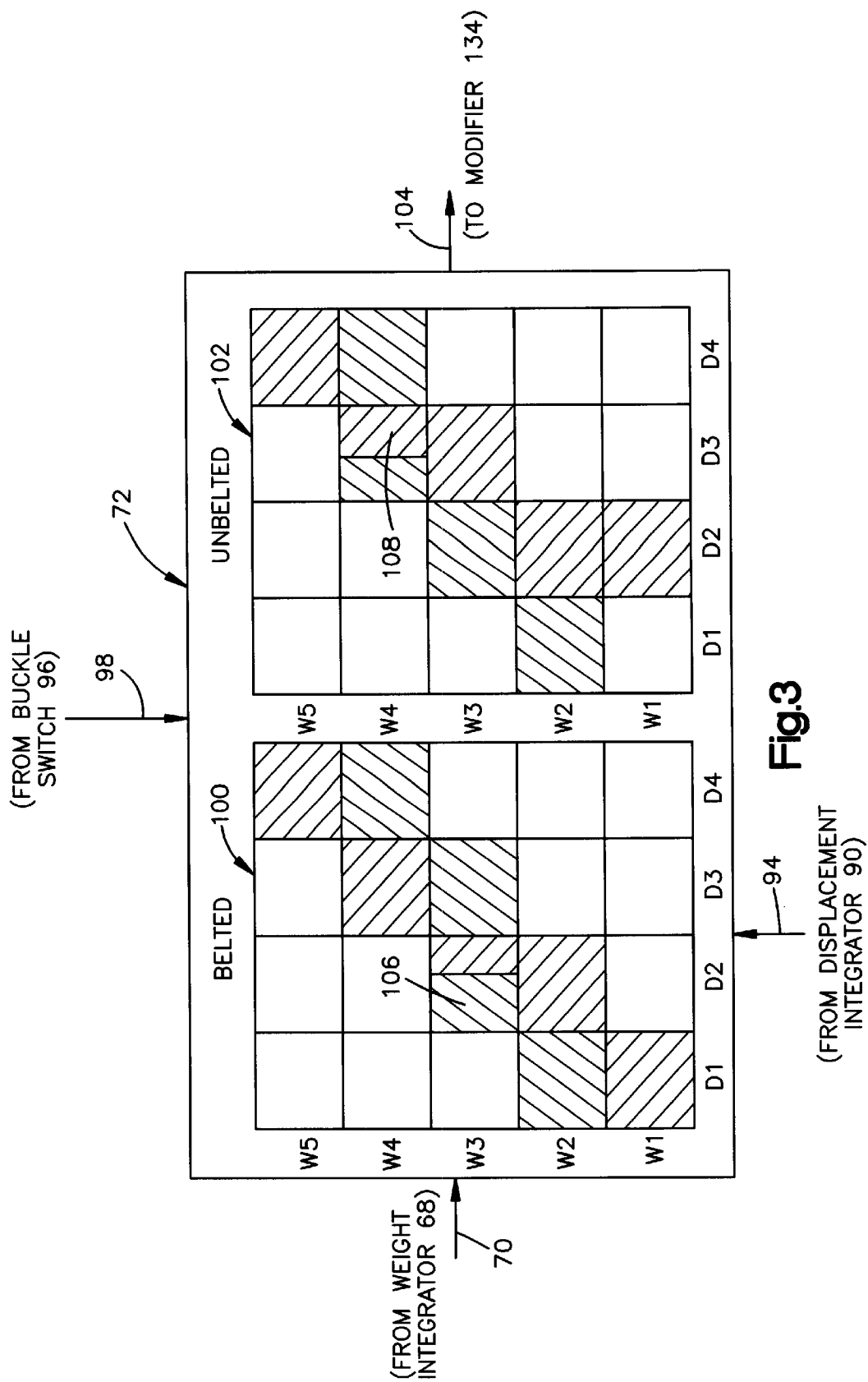
FIG. 3 is a schematic representation of a control matrix of the system of FIG. 2.

Referring to FIGS. 3, the control matrix 72 preferably includes a look-up table which is divided into a plurality of discrete control zones or functions having values that vary as a function of the input signals 70, 94, and 98. The control matrix 72 provides a signal 104 which has a characteristic based on the occupant's weight, the occupant's pre-crash position, as well as whether the occupant is belted. The output signal 104 is used to control actuation of the actuatable protection devices 20 and 24 as well as any other actuatable protection device associated with the vehicle seat 16.

The control matrix 72, for example, is divided into two arrays, one array 100 for a belted occupant condition and the other array 102 for an unbelted occupant condition. By way of example, each array 100 and 102 is a two dimensional array having a weight axis and a position axis. Arrays, in accordance with the present invention, may have additional dimensions corresponding to other sensed or determined occupant conditions or characteristics.

The weight axis (the y axis) is divided into a plurality of discrete weight ranges between a zero weight value and some predetermined maximum weight value for each of the arrays 100 and 102. In FIG. 3, for example, the weight axis is divided into five discrete ranges, indicated at $W_1$, $W_2$, $W_3$, $W_4$, and $W_5$. Each of these ranges $W_1$–$W_5$ is calibrated to correspond to a selected range of weight values from a minimum range $W_1$ of an expected object on the seat to a maximum range $W_5$ of an expected object on the seat. The weight range for a given object is based on the weight value provided by the weight sensor integrator signal 70. An object weighing more than a maximum predetermined amount will be characterized as being in the maximum weight range $W_5$.

FIG. 4 illustrates an example for weight ranges $W_1$–$W_5$ in the arrays, indicated at 100' and 102'. Specifically, $W_1$ corresponds to a range of less than 14 kg. $W_2$ provides a weight range from 14 kg to 30 kg and $W_3$ provides a range from 30 kg to 65 kg. $W_4$ corresponds to a weight range from 65 kg to 85 kg, with $W_5$ corresponding to any sensed weight value determined to be greater than 85 kg.

In each of the arrays 100 and 102 (FIG. 3), the displacement axis (the x axis) also is divided into a plurality of discrete position ranges. The position ranges are determined, for example, by dividing the distance between the deployment door or cover of the air bag 20 and the back of the seat 16 when the seat is in its rearward most position, i.e., the maximum expected distance. In FIG. 3, the displacement axis of each array 100, 102 is divided into four discrete position ranges of values for an occupant's pre-crash position or displacement relative to the cover of the air bag 20, indicated at $D_1$, $D_2$, $D_3$, and $D_4$. Each of these displacement ranges $D_1$–$D_4$ corresponds to a selected range of displacement values for an occupant of the seat 16. The terms displacement and position are both used. Again, it is the position of the occupant from the cover of the air bag that is used in the control algorithm. A crash event may cause an occupant to be displaced relative to the door of the air bag. The displacement is the position of the occupant relative to the air bag door.

The divisions of $W_1$–$W_5$ and $D_1$–$D_4$ are shown as being equal divisions forming square zones. The line that separates two zones, e.g., $W_3$ and $W_4$, or $D_2$ and $D_3$ does not have to be straight line. The divisions of the matrices are shown as straight lines for simplicity of discussion and understanding. The above-mentioned '359 patent teaches different shaped control zones.

For simplicity of explanation, FIG. 4 illustrates only two ranges $D_1$ and $D_2$ for occupant displacement or position. The lower range $D_1$ corresponds to a detected distance between the occupant or object of the seat 16 and the door of the air bag 20 which is less than or equal to 20 cm. Similarly, $D_2$ corresponds to a situation when the occupant or object is more than 20 cm from the door of the air bag 20.

While the ranges in the foregoing examples are calibrated in terms of the object's position relative to the door of the air bag, the present invention also contemplates utilizing other aspects of the object's relative position within the vehicle to control actuation of the actuatable protection devices 20 and 24. For example, the controller 26 also could determine whether a vehicle occupant is partially out of position and/or the degree to which the occupant is out of position. The controller 26 may also determine a position value for particular portions of an occupant relative to other actuatable occupant protection devices. For example, sensors may be used to measure the relative position of an occupant's head, torso, and/or arms relative an actuatable head restraint and/or side air bag. These parameters could be provided to the control matrix 72 to define additional dimensions of each of the arrays 100', 102'.

Each function within the arrays 100' and 102' contains a value, indicating either a non-deployment condition or specifying particular control information for a deployment condition. The deployment control values of each function of the arrays 100' and 102' are determined based on empirical testing for a particular vehicle platform. The control information preferably indicates a desired amount of time delay to impose between stages in a multiple stage inflatable protection device, such as a multiple stage air bag 20. Such information also might be used to control a particular actuation sequencing and timing for a plurality of actuatable protection devices associated with the seat 16 and/or the control of vent values. The value associated with each function varies as a function of the weight values $W_1$–$W_5$ and the displacement values $D_1$–$D_4$ for the vehicle occupant. Specifically, whether a deployment or non-deployment condition exists and control information for a deployment condition, such as the amount of time delay to be provided between actuatable stages, depends on (i) the value of the buckle switch signal 98, (ii) the range value where the weight sensor integrator signal 70 falls, and (iii) the range value where the displacement sensor integrator signal 94 falls.

Because it is possible that a particular sensor may malfunction or that some occupant conditions or characteristics may not be detected in every vehicle platform, the belted and unbelted arrays 100 and 102 of the control matrix 72 are configured to provide predetermined default values when certain occupant conditions or characteristics are either absent or irregular. The use of default values means that a single controller 26 could be used with different vehicle platforms that do not have all the same sensors. One platform could use both an ultrasonic position sensor 50 and seat position sensor 56 and a different vehicle platform has only ultrasonic position sensor 50. The default values used in the present invention are empirically determined for a group or class of vehicle platforms of interest and are stored in memory of the controller 26.

Default parameters may, for example, be provided for an occupant's weight and/or relative position within the vehicle. Such default values are especially helpful in situations when at least one of the weight signals 64–66, 70 or the displacement signals 82–88, 94 is absent as well as when one of the values of the integrated signals 70 or 94 is outside an expected range of values. In a situation when both the weight and displacement sensor signals 70 and 94 are either absent or outside an expected range of values, the control matrix 72 provides a default value corresponding to a normally positioned 50% vehicle occupant, which is a normally seated (i.e., located a certain distance from the air bag), 150 pound person. By providing the default values for irregular and absent weight and/or position information, the present invention is automatically adaptable to many different vehicle platforms, regardless of the number and type of occupant sensors as well as when any existing sensors malfunction. With the system architecture in accordance with the present invention, the control system can be used with many different vehicle platforms without the need for custom programming for each vehicle platform.

Preferably, when only one of the values of the position or weight signals 94 and 70 is detected and determined to be within an expected range of values, a default value for the other one of the weight or position signals is determined as a function of the actually detected weight or position signal.

Specifically, a default value for the weight signal 70 can be determined (i.e., when the signal is missing or out of range) as a function of the value of a detected displacement (i.e., position) signal 94. Similarly, a default value for the displacement signal 94 can be determined (i.e., when the signal is missing or out of range) as a function of a detected value of the weight signal 70.

In the arrays 100 and 102 of FIG. 3, the default values for the weight sensor signal are indicated by diagonal lines having a positive slope, whereas the default values for the displacement sensor signals 94 are indicated by diagonal lines having a negative slope. In a belted condition (array 100), for example, when the value of the displacement signal 94 is within range $D_2$ and the value of the weight signal 70 is either absent or outside of an expected range of values, the default value for the weight sensor signal 70 is set equal to the weight range $W_3$. This results in the control matrix signal 104 having control information defined by function 106.

For an unbelted condition (array 102) when the weight sensor signal 70 has a value within range $W_4$ and the displacement signal 94 is either absent or has a value outside an expected range of values, the default displacement value is set equal to $D_3$. This results in the control matrix signal 104 having control information defined by function 108. As stated above, the control information may include time delay data for imposing between actuatable stages, sequencing and timing information for the actuatable protection devices associated with the seat, and the level of actuation desired based on the sensed parameters.

The particular weight and position ranges are a matter of design choice and will tend to vary based on the particular class of vehicle platform. However, the different types of vehicles with a particular class of vehicle platform do not have to be equipped with the same sensors. Also, the restraint system 10 remains functional even when a sensor failure occurs so as to provide controlled inflation. Any number of ranges for each axis may be used to provide a desired control over actuation of protection devices 20 and 24. The control varies as a function of the occupant's sensed weight and sensed position as well as whether the occupant is belted. Instead of using predetermined look-up tables, the function of the control matrix 72 also could be implemented by real-time calculations based on the values of the input signals 70, 94, and 98 including default values for missing or out-of-range sensor outputs.

Referring back to FIG. 2, the system 10 further includes a vehicle crash event sensing system 116 which includes at least one and preferably a plurality of vehicle crash event sensors 28, 30 and 59. Other crash event sensing devices, such as crush zone sensors 32–36 (FIG. 1), could form part of the crash event sensing system 116. However, for simplicity of explanation, the sensor system 116 includes crash sensors 28, 30 and 59.

The acceleration sensors 28 and 30 provide signals 124 and 126, respectively, having electrical characteristics indicative of vehicle crash acceleration. The crash acceleration signals can take any of several forms known in the art. The crash acceleration signals 124 and 126, for example, can have amplitude, frequency, pulse duration, and/or other characteristics that vary as a function of the sensed crash acceleration. Preferably, the crash acceleration signals have frequency and amplitude components that are functionally related to the crash acceleration.

The crash acceleration signals 124 and 126 are provided to a crash severity algorithm 130 of the controller 26. Prior to the acceleration signals 124 and 126 being provided to the controller 26, however, it is desirable to filter acceleration signals 124 and 126 to eliminate frequencies resulting from extraneous vehicle operating events and/or signals resulting from road noise. The frequency components removed through such filtering are not indicative of the occurrence of a vehicle crash event for which deployment of the actuatable protection devices is desired. Empirical testing is used to determine accelerometer frequency values indicative of a deployment crash condition for a particular vehicle platform of interest. Such filtering may be performed by filtering algorithms in the controller 26 (i.e., using digital filtering) or by suitable discrete filter circuits (not shown).

The rollover sensor 59 similarly provides a signal 128 to the controller 26 having an electrical characteristic indicative of a vehicle rollover condition. The signal 128 from the rollover sensor 59 also may be filtered to remove signal components not indicative of a vehicle rollover condition. The crash sensor signals 124, 126, and 128 are provided to a crash severity algorithm 130 of the controller 26.

The crash severity algorithm 130 is a software module (i.e., program) stored in the controller 26 which discriminates between deployment and non-deployment crash events. The crash severity algorithm 130 determines the severity of the detected crash event based on the crash sensor signals 124, 126, and 128 and the buckle switch signal 98. The crash severity algorithm 130 provides a signal 132 having several components. One component indicates that a deployment crash condition is occurring and is used to actuate the first stage of a multi-stage restraint system. Other components are used, for example, to control actuation of other stages of the multi-stage restraint system 10 as well as other occupant protection devices associated with the system. These components are collectively referred to as a crash severity index value indicative of crash severity.

An example of one type of crash severity algorithm that can be used in the present invention is of the type disclosed in co-pending U.S. patent application Ser. No. 09/197,143, to Foo et al., filed Nov. 20, 1998, entitled "Method and Apparatus for Controlling an Actuatable Restraint Device Using Crash Severity Indexing and Crush Zone Sensor" which is assigned to TRW Inc., and is hereby incorporated herein by reference. Another example of a crash severity algorithm that can be used with the present invention is disclosed in U.S. patent application Ser. No. 09/108,819, filed Jul. 1, 1998 to Foo et al. entitled "Method and Apparatus for Controlling an Actuatable Restraint Device Using Crash Severity Indexing", and which is hereby incorporated by reference. Other types of crash algorithms also may be used with the present invention.

The crash severity algorithm 130 determines a crash severity index value for both a belted and unbelted condition. The crash severity index value preferably is a digital word having a value defined by a plurality of parameters and which controls actuation of the actuatable protection devices 20 and 24. The crash severity index value, for example, includes a parameter indicative of a minimum threshold value to fire a first stage of the multiple stage actuatable protection device (TTF_LOW). Values functionally related to sensor output signals 124, 126, and 128 are determined and compared against this minimum TTF_LOW threshold value. The TTF_LOW value is set high enough so as to protect against inadvertent firing for predefined types of non-deployment crash events. The crash severity index value also includes a delta-T ($\Delta T$) value, which is determined from the time lapse between the crossing of the TTF_LOW threshold value and the crossing of a second threshold.

The determined ΔT is used to control secondary stages of the multiple stage actuatable protection device of a multi-stage air bag restraint. The signals 132 also contain a pretensioner parameter, e.g., TTF_Pretensioner, indicating if and when the seat belt pretensioner device 24 is to be actuated. The TTF_Pretensioner parameter is determined in response to the crash sensor signals 124, 126, and 128 and the condition of the buckle switch signal 98.

The crash severity algorithm 130 provides the crash severity signal 132 to a modifier function 134 indicating the crash severity index value, which includes parameters indicative of a crossing of the TTF_LOW value, the ΔT value, and the TTF_Pretensioner value. The signal 132 is used to control actuation of the multi-stage inflatable protection device 20 and the pretensioner device 24. The control matrix signal 104 also is provided to the modifier function 134. The modifier function 134 modifies at least one of the parameters of the crash severity index signal 132 in response to the value of the control matrix signal 104 thereby changing the actuation time of the protection devices 20, 24.

The modifier function 138 provides a modified crash severity signal 136 to an enable/disable function 138. As stated above, the control matrix signal 104 has a value that alters the value of signal 132 that, in turn, effects the actuation of the actuatable protection devices 20 and 24 in response to, for example, a detected or default occupant position value and a detected or default occupant weight value. Accordingly, the modifier 134 changes one or more parameters of the crash severity index value as a function of the value of the control matrix signal 104. The modified crash severity signal 136 is provided to the enable/disable function 138 of the controller 26.

In certain situations, such as when the vehicle occupant is determined to be too light or out-of-position, the control matrix signal 104 also may have a value which disables the actuatable protection devices 20 and 24, such as by disabling or removing the TTF_LOW parameter of the crash severity signal 132. Referring to the example shown in FIG. 4, when the weight of the occupant or other object positioned on the passenger seat 16 is determined to be less than about 14 kilograms, the control matrix signal 104 provides a value that will modify signal 132 so that the result ensures no deployment or actuation of any of the devices 20, 24. This results in the modifier 134 disabling the air bag 20 and the pretensioner device 24 in response to the signal 104. Other weight and position values result in modifying the TTF_LOW value, the ΔT value, and the TTF_Pretensioner value. This is shown in FIG. 4.

For the passenger seat 16, the system 10 preferably also includes a rearward facing infant seat (RFIS) detection system 139 and an occupant presence detection system 141. These detection systems 139 and 141 provide signals that are used in Boolean logic operations with the signal 136 from the modifier function 134 to either enable or disable actuation of the protection devices 20 and 24.

The RFIS detection system 139 includes a RFIS detector 140, which preferably is a software module or program within the controller 26. The RFIS detector 140 determines whether the occupant protection devices 20 and 24 should be actuated. Specifically, the RFIS detector determines whether a rearward facing infant seat is present on seat 16 based on an input signal 150 from an RFIS integrator 144. The RFIS integrator 144 receives the buckle switch signal 98 and a signal 148 from the weight-sensing system 46 and a signal 146 from the occupant-sensing system 76. While two signals 146 and 148 are shown to be provided to the RFIS integrator 144, a plurality of occupant condition signals, such as those being provided by the individual sensing devices 60–62 and/or 50, 52, 56, and 78, alternatively may be provided to the RFIS integrator 144.

The RFIS integrator 144 evaluates the signals 98, 146, and 148 to provide a composite signal 150 having (i) a value indicating a probability of whether a rearward facing infant seat is present on the seat 16 and (ii) whether a belted or unbelted condition exists. In the event that the signal 150 from the RFIS integrator 144 is absent or outside an expected range of values as could occur if any of the signals input to the integrator 144 are missing or out of limits (e.g., a sensor is missing or faulty), the RFIS detector 140 determines that a default condition exists and preferably indicating that an RFIS is not present on seat 16. It is contemplated that a RFIS detector such as disclosed in U.S. Pat. No. 5,605,348 or a combination of sensors to detect RFIS such as disclosed in U.S. Pat. No. 5,454,591 could be used in the present invention as the sensor 78.

The RFIS detector 140 provides a signal 152 to the enable/disable function 138 indicative of the presence or absence of an RFIS on seat 16. When the RFIS detector 140 determines that a rearward facing infant seat is present, the RFIS detector provides a DISABLE signal 152. On the other hand, when the RFIS detector 140 receives a signal 150 indicating that no rearward facing infant seat is located on the seat or when a default condition exists, the RFIS detector provides an ENABLE signal 152. The signal 152 is used to provide logic control to enable or disable the actuatable protection devices 20 and 24. Again, a determined out-of-range or improper RFIS signal by RFIS detector 140 will result in detector 140 providing a default signal.

Similarly, the occupant presence detection system 141 determines whether an occupant is present on the seat 16. The occupant presence detection system includes an occupant presence detector 142 that receives a signal 154 from a presence integrator 156. The presence integrator 156, like the RFIS integrator 144, receives the buckle switch signal 98, a signal 158 from the weight sensing system 46, and a signal 160 from the occupant sensing system 76. A plurality of signals alternatively could be provided to the presence integrator 156 by the individual sensors 60–62, 50, 52, 54, and/or 78. The presence integrator 156 resolves and/or combines the received signals 98, 158, and 160 to provide an indication of the probability that an occupant seat is empty or whether an occupant or some other object is present in the vehicle seat 16.

The presence integrator 156 provides the output signal 154 to the occupant presence detector 142 indicative of the probability of an occupant on the seat 16 along with an indication of whether a belted or unbelted condition exists. The occupant presence detector 142, in turn, provides an output signal 162 to the enable/disable function 138 having a value either to enable or disable the occupant protection devices 20, 24. When the occupant's seat 16 is determined to be empty, for example, the occupant presence detector provides a DISABLE signal 162. When the occupant's seat 16 is determined to be occupied or in the event of a default condition, the occupant presence detector 142 provides an ENABLE signal 162. The occupant presence detector 142 provides the default indication of an occupant is present (i.e., an ENABLE signal) when the signal 154 is missing or out of limits as could occur when an input signal to the presence integrator 156 is missing or out of limits (e.g., a sensor is missing or faulty). The occupant presence detection system 141 thus provides logic control over the occupant protection devices 20 and 24 based on whether an occupant is determined to be on the seat 16 and whether the buckle switch signal indicates a belted or unbelted condition.

The output signals 152 and 162 are provided to the enable/disable function 138 which carries out the instructions provided by such signals. Accordingly, if either of the detectors 140 or 142 provides a DISABLE instruction to the enable/disable function 138, at least one and preferably both actuatable protection devices 20 and 24 are disabled. When both signals 152 and 162 are ENABLE signals, the actuatable protection devices 20, 24 are controlled in response to the modified signal 136.

The enable/disable function 138 provides an output signal 170 to a translator interface 172. Upon receiving an ENABLE instruction on signals 152 and 162, the enable/disable function 138 simply passes the modified signal 136 to the translator interface 172. When, on the other hand, the enable/disable function 138 receives a DISABLE signal 152 or 162 from either the RFIS detector 140 or the presence detector 142, the enable/disable function disables the crash signal 136 from the modifier function 134 from being provided to the translator interface 172. This prevents actuation of the protection devices 20, 24 associated with the passenger seat 16.

When both signals 152 and 162 are ENABLE signals, the translator interface 172 translates the parameters of the modified signal 136 for a specific multi-stage inflator and/or pretensioner device. The translation is performed using manufacturer specifications and/or empirical testing data for the particular vehicle platform. The translator makes the present control arrangement universal despite variations in actuatable restraint devices. The translator makes alterations in the crash signal 136 to account for variations in differing inflation rates in air bag devices manufactured by different manufacturers. The translator interface 172 then provides control signals 174 and 176 to the appropriate actuatable occupant protection devices 20 and 24, respectively, of the occupant restraint system 178. As stated above, the occupant restraint system 178 may include other known actuatable occupant protection devices that receive control signal from the translator 172.

The signal 174 provided to the inflatable occupant protection device 20, for example, are provided to appropriate driver circuits (not shown) to provide sufficient electrical current to actuate each stage of the multi-stage air bag 20. The signal 174 controls the time to fire the first stage (e.g., when TTF_LOW is exceeded) of the multiple stage device 20. The signals 174 also control when, if at all, to fire the second stage of the device 20 based on the ΔT value.

If the individual on the passenger seat 16 is determined to be belted, the translator interface 172 also provides the signal 176 to control actuation of the seat belt pretensioner device 24 based on the TTF_Pretensioner parameter of the signal 170. The signal 176 may be provided to a suitable driver circuit (not shown) which provides a sufficient amount of electric current to actuate the pretensioner device 24 in response to the signal 176.

The foregoing description for the system of FIG. 2 has been described with respect to the passenger seat 16 in which a rear facing infant seat may be positioned. For the driver seat 14 (FIG. 1), however, REIS and occupant presence detectors are unnecessary and, therefore, may be removed from the control system 10 for the driver seat. If the same control is used on the driver's side as on the passenger side, the RFIS detector 140 outputs its default value, i.e., an ENABLE signal 152. The remaining described features of the system 10 shown and described with respect to FIGS. 2–4 are equally applicable to system for the driver seat 14 (FIG. 1).

Figure 5A:
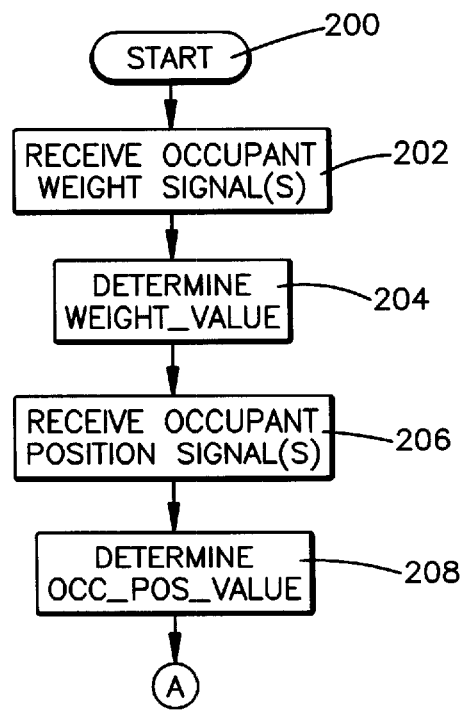
FIGS. 5A and 5B are flow diagrams for a control process performed by the system of FIG. 2.
Figure 5B:
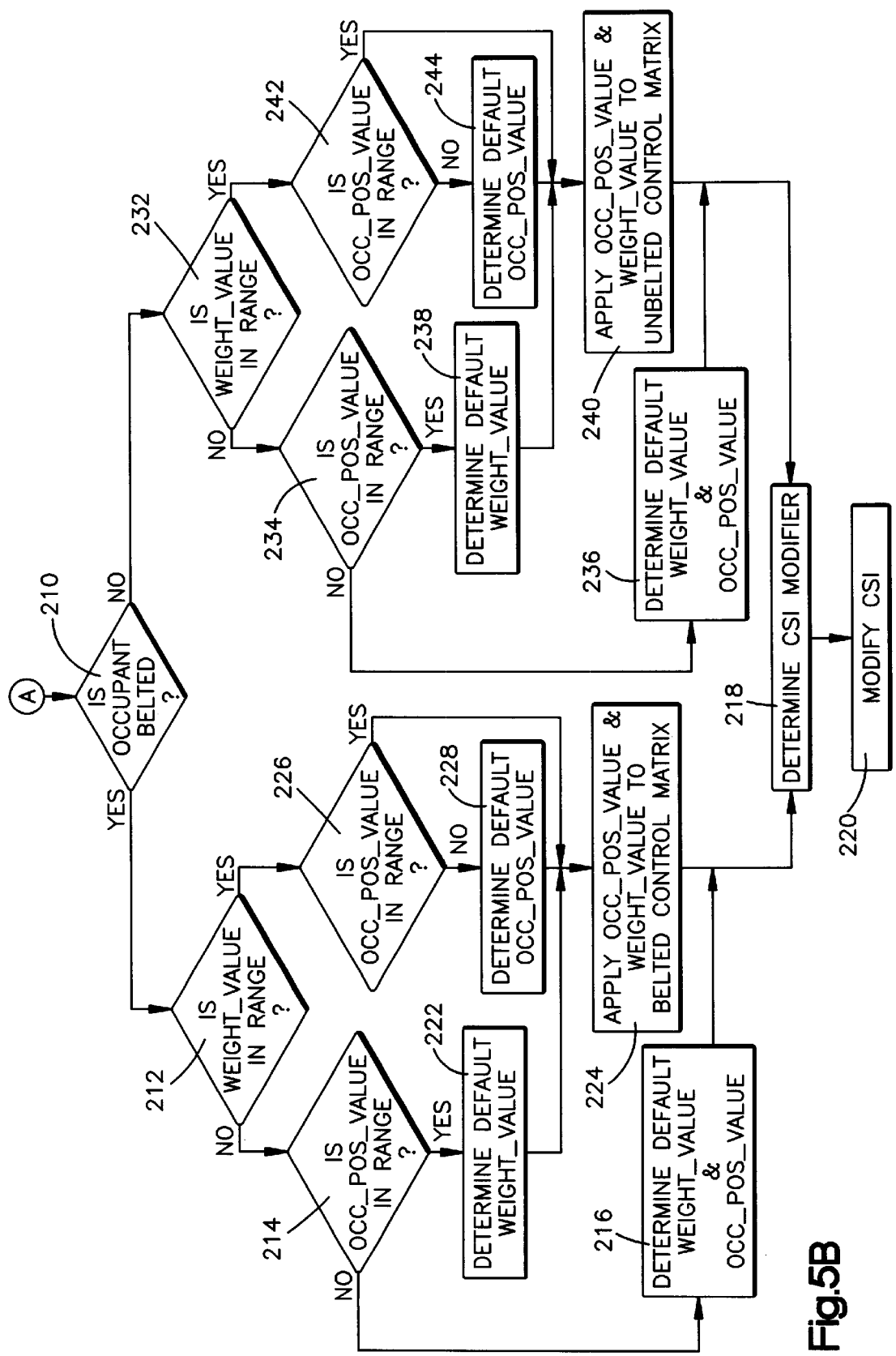

In view of the foregoing structure of the restraint or protection system 10, the operation of the controller 26 and the control matrix 72 will be better appreciated with reference to the flow diagrams of FIGS. 5A and 5B. The process begins at step 200 in which parameters of the controller 26 are initialized, memories cleared, and initial flag conditions are set. The process proceeds to step 202 in which the weight integrator 68 of the controller 26 receives the occupant weight signals 64 and 66 from the weight sensors 60 and 62.

The process proceeds to step 204 where a weight value is determined in response to the weight sensor signals 64 and 66. As previously mentioned, the weight sensor integrator 68 comprises an algorithm for deriving an indication of the occupant's weight which, for example, falls within one of five discrete weight ranges (FIGS. 3 and 4). Pre-crash position data also may be determined from the weight sensing system based on the weight distribution and a center of gravity calculation in response to the signals provided from the weight sensors 60–62 of the weight sensing system 46. The weight sensor integrator 68 provides a weight signal 70 to the control matrix 72 indicating a measured weight value for an object located on the seat 16.

The process proceeds to step 206 in which the displacement sensor integrator 90 receives occupant position signals 82–88 from the occupant position sensors 50, 52, 56, 78.

The process then proceeds to step 208 in which an occupant position value is determined by the displacement sensor integrator 90 based on the sensor signals 82–88 and the weight signal 92. In response to the signals 82–88 and 92, the displacement sensor integrator 90 derives an indication of the position for an object on the seat 16 and, in turn, provides a signal 94 to the control matrix 72 having a value indicative of the determined position. Depending upon the resolution and accuracy of the various occupant sensing devices 50, 52, 54 and 78, the position signal 94 may also separately indicate the position of an occupant's torso, arms, and/or head. Such information generally permits a greater degree of control over the protection devices based on an occupant's determined pre-crash position. The process proceeds to step 210 (FIG. 5B).

In step 210, a determination is made whether the occupant is belted. This determination is based on the buckle switch signal 98 from the buckle switch sensor 96. If the determination is affirmative, indicating that the occupant is belted, the process proceeds to step 212. For the belted situation, the control matrix 72 utilizes the belted array 100, 100' (FIGS. 3 and 4).

In step 212, another determination is made whether the detected weight value provided by signal 70 is present and within an expected range of values. If this determination is negative, indicating either that no occupant weight signal 70 is being received or that the value of the weight signal is outside of the expected ranged of values (i.e., outside of limits), the process proceeds to step 214.

Step 214 corresponds to a situation when a default value for the occupant's weight is used. In step 214, a determination is made whether the occupant's position value is being received and within an expected range of values. In the event that the determination in step 214 is negative, indicating that the displacement sensor integrator signal 94 is absent or the value of the signal is outside an expected range of values (outside limits), the process proceeds to step 216.

In step 216, default values for both the weight and occupant position are determined. As stated above, the occupant weight and position are set to a normally seated, fifty-percentile vehicle occupant. The process advances to step 218 to determine a crash severity index (CSI) modifier value. This may include values to change any parameter of the crash severity index. The CSI modifier value includes, for example, a ΔT modifier value which, in this situation, e.g., for the normally seated, 50% vehicle occupant, is set equal to zero.

The process then proceeds to step 220 in which the crash severity index value, which has been determined by the crash severity algorithm 130, is modified according to the CSI modifier value determined in step 218. In this situation, where the ΔT delay equals zero, the crash severity index parameters from the crash severity algorithm 130 will not be modified. Accordingly, the crash severity index value will be provided to the enable/disable function 138, as described above, without modification.

If the determination back at step 214 is affirmative, indicating that the occupant position value is within the expected range of values, the process proceeds to step 222. In step 222, a default weight value is determined as a function of the occupant position value, such as shown and described above with respect to FIG. 3.

The process then proceeds to step 224 in which the occupant position value and the determined default weight value are applied to the belted control array 100, 100' (FIGS. 3 or 4). The weight and position values define a value for a CSI modifier value, which is determined in step 218. The process then proceeds to step 220 in which the value of the crash severity index is modified according to the CSI modifier value determined in step 218.

In the event that the determination of step 212 is affirmative, indicating that the weight value is within an expected range of values, the process proceeds to step 226. In step 226, a determination is made whether the occupant position signal 94 is absent or whether the occupant position value is within a range of expected values. If the determination at step 226 is negative, indicating that the occupant position value is not within an expected range of values or has otherwise not been provided, the process proceeds to step 228.

In step 228, a default occupant position value is determined for a belted vehicle occupant as a function of the weight value provided by the weight sensor integrator signal 70. This is accomplished, for example, by applying the weight value to the belted array 100 (FIG. 3) which, in turn, provides a corresponding default position value.

The process then proceeds to step 224 where the default occupant position value and the determined weight value are applied to the belted array 100, 100' (FIGS. 3 and 4) of the control matrix 72 to provide a CSI modifier value (step 218). The CSI modifier value is provided by the control matrix 72 in output signal 104 to, in turn, modify the crash severity value (step 220) determined by the crash severity algorithm 130.

If the determination at step 226 is affirmative, indicating that both the occupant position value and the weight position value are within the expected range of values, the process advances to step 224. In step 224, the detected weight and position values are applied to the belted array 100, 100' (FIGS. 3 and 4) to define a corresponding CSI modifier value (step 218). The process continues to step 220 where the crash severity index value determined by the crash severity algorithm 130 is modified.

The process for an unbelted condition is substantially similar to a belted condition. Specifically, if the determination in step 210 is negative, indicating an unbelted vehicle occupant, the process proceeds to step 232. The control matrix 72 utilizes the unbelted array 102, 102' when the buckle switch signal 98 indicates an unbelted vehicle occupant.

In step 232, another determination is made whether the signal 70 is present and whether the detected weight value is within an expected range of values. If this determination is negative, the process proceeds to step 234. In step 234, a determination is made whether the occupant's position value has been received and is within an expected range of values. In the event that the determination in step 234 is negative, indicating that the displacement sensor integrator signal 94 is absent or that the value of the signal is outside the expected range of values, the process advances to step 236.

In step 236, default values are determined for both the weight and occupant position, which are selected to correspond to a normally seated, fifty-percentile vehicle occupant. The process advances to step 218 to determine a CSI modifier value based on the default weight and position values. In this situation, the CSI modifier value is determined (step 218) to be zero and, therefore, the value of the crash signals are not modified (step 220).

If the determination in step 234 is affirmative, indicating that the occupant position value is within the expected range of values, the process proceeds to step 238. In step 238, a default weight value is determined as a function of the occupant position value and for an unbelted occupant, as shown and described above with respect to FIG. 3.

The process then proceeds to step 240 in which the occupant position value and the determined default weight value are applied to the unbelted control array 102 (FIG. 3). The weight and position values are used to determine a CSI modifier value (step 218). The process then proceeds to step 220 in which the crash severity index value is modified according to the CSI modifier value determined in step 218.

In the event that the determination of step 232 is affirmative, indicating that the weight value is within an expected range of values, the process proceeds to step 242. In step 242, a determination is made whether the occupant position value also has been received and is within a range of expected values. If the determination at step 242 is negative, indicating that the occupant position signal 94 is either absent or the value of the detected occupant position signal 94 is not within an expected range of values, the process proceeds to step 244.

In step 244, a default occupant position value is determined for an unbelted vehicle occupant as a function of the weight value provided by the weight sensor integrator signal 70. This is accomplished, for example, by applying a determined weight value to the unbelted array 102 (FIG. 3) which, in turn, provides a corresponding default position occupant value, as described above.

The process then proceeds to step 240 where the default occupant position value and the determined weight value are applied to the unbelted array 102 (FIG. 3) of the control matrix 72 to determine (step 218) a CSI modifier value. The control matrix 72 provides the control matrix signal 104 to the modifier function 134 having a value indicating the CSI modifier value. The modifier function 134 uses the CSI modifier value to modify the crash severity index value (step 220) determined by the crash severity algorithm 130.

If the determination of step 242 is affirmative, indicating that both the occupant position value and the weight position value are determined to be within the expected range of values, the process advances to step 240. In step 240, the detected weight and position values are applied to the unbelted array 102, 102' (FIGS. 3 and 4) of the control matrix 72 to determine a corresponding CSI modifier value (step 218). The process continues to step 220 to modify the crash severity index value that was determined by the crash severity algorithm 130. In particular the CSI modifier value is added to the ΔT value of the crash severity index value.

While the foregoing example describes the occupant parameters as being weight and position, parameters indicative of other occupant conditions or characteristics also may be used to control the actuatable protection devices. In addition, while the actuatable protection devices have been described as a front air bag 20 and a seat belt pretensioner device 24, other types of actuatable protection devices may, in accordance with the present invention, be controlled. Examples of other protection devices include a side air bag, a rollover air bag, a rear air bag, knee bolster, an inflatable seat belt, an adjustable load limiter, a variable energy absorbing device as well as any other known actuatable occupant protection devices.

From the above description of the invention, those skilled in the art will perceive improvements, changes and modifications. Such improvements, changes and modifications within the skill of the art are intended to be covered by the appended claims.

Having described the invention, the following is claimed:

1. A method for controlling actuation of at least one actuatable occupant protection device associated with a vehicle seat, said method comprising the steps of:
    receiving a first sensor signal having a first value indicative of a first sensed condition of an object of the vehicle seat;
    receiving a second sensor signal having a second value indicative of a second sensed condition of the object of the vehicle seat, the second sensed condition being different from the first sensed condition;
    determining a default value for the first sensed sensor signal upon determining the first value is outside an acceptable range of values; and
    providing a control signal to control actuation of the at least one actuatable occupant protection device associated with the vehicle seat having a value that varies as a function of the second value and one of the first value and the determined default value.

2. A method comprising the steps of:
    sensing an occurrence of vehicle crash event and providing a crash sensor signal indicative of the sensed vehicle crash event;
    sensing a first condition of an object within the vehicle and providing a first sensor signal having a value indicative of the sensed first condition;
    sensing a second condition of the object different from the first condition and providing a second sensor signal having a value indicative of the sensed second condition;
    determining a crash severity value indicative of the severity of a vehicle crash event in response to the crash sensor signal;
    determining a default value for the first sensor signal upon determining that the value of the first sensor signal is not within an expected range of values;
    determining a default value for the second sensor signal upon determining the value of the second sensor signal is not within an expected range of values; and
    modifying the crash severity value based on the values of one of the first sensor signal and the determined default value of the first sensor signal and one of the second sensor signal and the determined default value of the second sensor signal.

3. An apparatus for controlling actuation of at least one actuatable occupant protection device associated with a vehicle seat, said apparatus comprising:
    a first sensor input effective to receive a first sensor signal having a value indicative of a first condition of an object of the vehicle seat;
    a second sensor input effective to receive a second sensor signal having a value indicative of a second condition of the object of the vehicle seat, the second condition being different from the first condition; and
    a controller operative to determine a default value for the value of the first sensor signal upon determining the value of the first sensor signal is indicative of a fault condition of the first sensor signal, said controller being operative to provide a control signal to control actuation of the at least one actuatable occupant protection device associated with the vehicle seat, the control signal having a value that varies as a function of the received second sensor signal and the value of one of the received first sensor signal and the determined default value of the first sensor signal.

4. An occupant protection system comprising:
    crash sensor effective to sense an occurrence of vehicle crash event and to provide a crash sensor signal indicative of the sensed vehicle crash event;
    a first object condition sensor operative to sense a first condition of an object within the vehicle and to provide a first sensor signal having a value indicative of the sensed first condition;
    a second object condition sensor operative to sense a second condition of the object different from the first condition and to provide a second sensor signal having a value indicative of the sensed second condition; and
    a controller responsive to the crash sensor signal, the first sensor signal, and the second sensor signal, said controller determining a crash severity value indicative of the severity of a vehicle crash event in response to the crash sensor signal, said controller being operative to determine a default value for the value of the first sensor signal upon determining that the value of the first sensor signal is indicative of a fault condition of the first sensor signal, said controller being operative to determine a default value for the value of said second sensor signal upon determining the value of the second sensor signal is indicative of a fault condition of the second sensor signal, said controller modifying the crash severity value based on the values of one of the first sensor signal and the determined default value of the first sensor signal and one of the second sensor signal and the determined default value of the second sensor signal.

5. A method for controlling actuation of at least one actuatable occupant protection device associated with a vehicle seat, said method comprising the steps of:
    receiving a first sensor signal having a first value indicative of a first sensed condition of an object of the vehicle seat;
    receiving a second sensor signal having a second value indicative of a second sensed condition of the object of the vehicle seat, the second sensed condition being different from the first sensed condition;
    determining a default value for the first sensed sensor signal upon determining the first value is indicative of a fault condition of the first sensor signal; and providing a control signal to control actuation of the at least one actuatable occupant protection device associated with the vehicle seat having a value that varies as a function of the second value and one of the first value and the determined default value.

6. A method comprising the steps of:
sensing an occurrence of vehicle crash event and providing a crash sensor signal indicative of the sensed vehicle crash event;
sensing a first condition of an object within the vehicle and providing a first sensor signal having a value indicative of the sensed first condition;
sensing a second condition of the object different from the first condition and providing a second sensor signal having a value indicative of the sensed second condition;
determining a crash severity value indicative of the severity of a vehicle crash event in response to the crash sensor signal;
determining a default value for the first sensor signal upon determining that the value of the first sensor signal is indicative of a fault condition of the first sensor signal;
determining a default value for the second sensor signal upon determining the value of the second sensor signal is indicative of a fault condition of the second sensor signal; and
modifying the crash severity value based on the values of one of the first sensor signal and the determined default value of the first sensor signal and one of the second sensor signal and the determined default value of the second sensor signal.

7. An apparatus for controlling actuation of at least one actuatable occupant protection device associated with a vehicle seat, said apparatus comprising:
a first sensor input effective to receive a first sensor signal having a value indicative of a first condition of an object of the vehicle seat;
a second sensor input effective to receive a second sensor signal having a value indicative of a second condition of the object of the vehicle seat, the second condition being different from the first condition; and
a controller operative to determine a default value for the value of the first sensor signal upon determining the value of the first sensor signal is outside an acceptable range of values, said controller being operative to provide a control signal to control actuation of the at least one actuatable occupant protection device associated with the vehicle seat, the control signal having a value that varies as a function of the received second sensor signal and the value of one of the received first sensor signal and the determined default value of the first sensor signal.

8. The apparatus as set forth in claim 7 wherein said controller determines a default value for the value of said second sensor signal upon determining the value of the second sensor signal is outside an expected range of values, said controller providing the control signal with a value that varies as a function of the values of at least one of the received first and second sensor signals and, if determined, at least one of the determined default values of the first and second sensor signals.

9. The apparatus of claim 8 wherein the determined default value of the second sensor signal varies as function of the value of the received first sensor signal.

10. The apparatus of claim 7 wherein the determined default value of the first sensor signal varies as a function of the value of the received second sensor signal.

11. The apparatus of claim 7 wherein the value of the first sensor signal is indicative of a weight of the object of the vehicle seat and the value of the second sensor signal is indicative of a position of the object of the vehicle seat.

12. The apparatus as set forth in claim 7 wherein said controller is operative to determine a default value for the value of said second sensor signal upon determining the value of the second sensor signal is outside an expected range of values, said controller providing the control signal with a value that varies as a function of the values of one of the received and default first sensor signal and one of the received and default second sensor signal.

13. The apparatus as set forth in claim 12 further including a crash sensor effective to sense an occurrence of a vehicle crash event and to provide a crash sensor signal indicative of the sensed vehicle crash event, said apparatus, in response to the crash sensor signal, providing a crash severity signal having a value indicative of the severity of the sensed vehicle crash event, said controller modifying the crash severity signal as a function of the value of the control signal.

14. The apparatus as set forth in claim 13 wherein the crash severity signal includes a time delay value for imposing a time delay between actuatable stages of the at least one actuatable occupant protection device, said apparatus being operative to modify the time delay value of the crash severity signal based on the value of the control signal.

15. The apparatus of claim 12 wherein the value of the first sensor signal is indicative of a weight of the object of the vehicle seat and the value of the second sensor signal is indicative of a position of object of the vehicle seat.

16. The apparatus of claim 15 further including a buckle condition input which is effective to receive a buckle condition signal having a value indicative of whether a seat belt of the vehicle seat is belted, the value of the control signal further varying as a function of the buckle condition signal.

17. The apparatus of claim 16 wherein the determined default values of the first and second sensor signals vary in response to the value of the buckle condition signal.

18. An occupant protection system comprising:
crash sensor effective to sense an occurrence of vehicle crash event and to provide a crash sensor signal indicative of the sensed vehicle crash event;
a first object condition sensor operative to sense a first condition of an object within the vehicle and to provide a first sensor signal having a value indicative of the sensed first condition;
a second object condition sensor operative to sense a second condition of the object different from the first condition and to provide a second sensor signal having a value indicative of the sensed second condition; and
a controller responsive to the crash sensor signal, the first sensor signal, and the second sensor signal, said controller determining a crash severity value indicative of the severity of a vehicle crash event in response to the crash sensor signal, said controller being operative to determine a default value for the value of the first sensor signal upon determining that the value of the first sensor signal is not within an expected range, said controller being operative to determine a default value for the value of said second sensor signal upon determining the value of the second sensor signal is not within an expected range, said controller modifying the crash severity value based on the values of one of the first sensor signal and the determined default value of the first sensor signal and one of the second sensor signal and the determined default value of the second sensor signal.

19. The apparatus of claim 18 wherein the determined default value of the second sensor signal varies as function of the value of the first sensor signal.

20. The apparatus of claim 18 wherein the determined default value of the first sensor signal varies as a function of the value of the second sensor signal.

21. The apparatus of claim 18 wherein the value of the first sensor signal is indicative of a weight condition of the object within the vehicle and the value of the second sensor signal is indicative of a position condition of the object within the vehicle.

22. The apparatus of claim 18 wherein said controller further includes a control matrix having an array of values functionally related to at least the values of the first and second sensor signals, said control matrix providing a signal which has a value that varies as a function of the values of at least one of the received first and second sensor signals and the determined default value of the first and second sensor signals, said controller modifying the value of the crash severity signal based on the value of the control matrix signal.

23. The apparatus as set forth in claim 22 wherein the crash severity signal includes a time delay value for imposing a time delay between actuatable stages of the at least one actuatable occupant protection device, said controller modifying the time delay value of the crash severity signal based on the value of the control matrix signal.

* * * * *